(12) United States Patent
Xu et al.

(10) Patent No.: US 11,151,689 B2
(45) Date of Patent: Oct. 19, 2021

(54) IMAGE PROCESSING METHOD, DEVICE AND SYSTEM, AND COMPUTER READABLE STORAGE MEDIUM

(71) Applicant: SHENZHEN SKYWORTH-RGB ELECTRONIC CO., LTD., Shenzhen (CN)

(72) Inventors: Yaoling Xu, Shenzhen (CN); Jian Li, Shenzhen (CN); Zhenghua Lu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/940,602

(22) Filed: Jul. 28, 2020

(65) Prior Publication Data
US 2020/0357095 A1    Nov. 12, 2020

Related U.S. Application Data

(63) Continuation of application No. PCT/CN2018/101737, filed on Aug. 22, 2018.

(30) Foreign Application Priority Data

Jan. 30, 2018  (CN) .......................... 201810093839.2

(51) Int. Cl.
*G06T 3/40* (2006.01)
*G06F 16/583* (2019.01)
(Continued)

(52) U.S. Cl.
CPC ............ *G06T 3/4053* (2013.01); *G06F 16/53* (2019.01); *G06F 16/583* (2019.01);
(Continued)

(58) Field of Classification Search
None
See application file for complete search history.

(56) References Cited

U.S. PATENT DOCUMENTS

| | | |
|---|---|---|
| 2006/0181643 A1 | 8/2006 | Haan |
| 2010/0157146 A1 | 6/2010 | Jung et al. |
| | (Continued) | |

FOREIGN PATENT DOCUMENTS

| | | |
|---|---|---|
| CN | 102364963 A | 2/2012 |
| CN | 104202624 A | 12/2014 |
| | (Continued) | |

OTHER PUBLICATIONS

First Office Action in counterpart Chinese Application No. 201810093839.2, dated Dec. 4, 2019.
(Continued)

*Primary Examiner* — Yi Wang
(74) *Attorney, Agent, or Firm* — Westbridge IP LLC

(57) ABSTRACT

The present disclosure provides an image processing method applied to a displaying terminal. The method includes: receiving a to-be-processed layer image delivered by the displaying terminal; querying a high resolution layer image matched with the to-be-processed layer image in a preset database based on the to-be-processed layer image; and delivering the high resolution layer image to the displaying terminal, thereby the displaying terminal processes the to-be-processed layer image based on the high resolution layer image. The present disclosure further discloses an image processing device, system and computer readable storage medium. According to the disclosure, an image resolution is improved.

15 Claims, 4 Drawing Sheets

(51) Int. Cl.
    *G06F 16/53* (2019.01)
    *G06T 5/00* (2006.01)
    *G06T 5/50* (2006.01)
    *G09G 5/377* (2006.01)

(52) U.S. Cl.
    CPC ............ *G06T 3/4023* (2013.01); *G06T 5/002* (2013.01); *G06T 5/50* (2013.01); *G09G 5/377* (2013.01); *G06T 2207/20212* (2013.01); *G09G 2340/0407* (2013.01); *G09G 2370/022* (2013.01)

(56) References Cited

U.S. PATENT DOCUMENTS

| | | | |
|---|---|---|---|
| 2011/0221966 A1* | 9/2011 | Hsieh | G06T 3/4053 348/665 |
| 2017/0018063 A1* | 1/2017 | Choudhury | G06T 7/12 |
| 2017/0235767 A1 | 8/2017 | Tusk | |
| 2018/0293707 A1* | 10/2018 | El-Khamy | G06N 3/0454 |

FOREIGN PATENT DOCUMENTS

| | | |
|---|---|---|
| CN | 105744357 A | 7/2016 |
| CN | 106846254 A | 6/2017 |
| CN | 106897979 A | 6/2017 |
| CN | 108282664 A | 7/2018 |
| JP | 2005269395 A | 9/2005 |
| JP | 5791244 B2 | 10/2015 |
| WO | 2014034378 A1 | 3/2014 |

OTHER PUBLICATIONS

International Search Report in corresponding PCT Application No. PCT/CN2018/101737, dated Nov. 13, 2018.

Second Office Action in counterpart Chinese Application No. 201810093839.2, dated Jul. 14, 2020.

Examination Report in counterpart Indian Patent Application No. 202027033293, dated Jul. 29, 2021.

* cited by examiner

IMAGE PROCESSING METHOD, DEVICE AND SYSTEM, AND COMPUTER READABLE STORAGE MEDIUM

CROSS-REFERENCE TO RELATED APPLICATIONS

The present application is a continuation application of International Application No. PCT/CN2018/101737, filed on Aug. 22, 2018, which claims the benefits of Chinese Patent Application with No. 201810093839.2, entitled "IMAGE PROCESSING METHOD, DEVICE, SYSTEM, AND COMPUTER READABLE STORAGE MEDIUM", which is filed on Jan. 30, 2018. The disclosures of the aforementioned applications are hereby incorporated by reference in their entireties.

FIELD

The present disclosure is related to the field of image processing technology, and in particular to an image processing method, device and system, and computer readable storage medium.

BACKGROUND

A 4K television refers to a television with high physical resolution, which is also configured to receive, decode as well as display related video signals of corresponding resolution. Nowadays, 4K televisions have been pervading the market rapidly, taking more than 50% of the entire television market share. However, there are very little contents for 4K television, the video source is in severe shortage. Therefore, for the moment it usually implements a local interpolation processing treatment on the 2K low resolution images using a 4K television terminal device directly, transforming the low resolution images into high resolution images, the high resolution images are to be used for broadcasting. However, this method requires the 4K television terminal device to have extremely high configuration, and the cost is relatively high. Furthermore, the images transformed are usually jagged, distorted, and fuzzy, the actual definition of which is not good.

SUMMARY

The major purpose of the present disclosure is to provide an image processing method, device, system, and computer readable memory medium, in order to solve a technical problem found in related technologies that a resolution of an image is still not high after being transformed by a displaying terminal device.

In order to realize the purpose above, the present disclosure provides an image processing method. The image processing method includes:

receiving a to-be-processed layer image sent by a displaying terminal device;

based on the to-be-processed layer image, querying a high resolution layer image matched with the to-be-processed layer image in a preset database;

sending the high resolution layer image to the displaying terminal, thereby the displaying terminal processes the to-be-processed layer image based on the high resolution layer image.

In some embodiments, after the step of receiving a to-be-processed layer image sent by a displaying terminal device, the method further includes:

analyzing the to-be-processed layer image, acquiring layer structure parameters of the to-be-processed layer image.

In some embodiments, the step of querying a high resolution layer image matched with the to-be-processed layer image in a preset database based on the to-be-processed layer image includes:

based on the layer structure parameters of the to-be-processed layer image, querying the high resolution layer image that matches with the layer structure parameters of the to-be-processed layer image.

In some embodiments, the step of sending the high resolution layer image to the displaying terminal, thereby the displaying terminal processes the to-be-processed layer image based on the high resolution layer image, includes:

delivering the high resolution layer image to the displaying terminal, thereby the displaying terminal implements a pixel filling process on the image of the to-be-process layer based on pixels of the high resolution layer image.

Besides, to realize the purpose above, the present disclosure also provides an image processing method, which is applied on an image processing system. The image processing system includes a cloud server and a displaying terminal. The image processing method includes the following steps:

delivering, by the displaying terminal, a to-be-processed layer image to the cloud server;

receiving, by the cloud server, the to-be-processed layer image, searching, by the cloud server, a high resolution layer image that matches with the to-be-processed layer image in a preset database;

receiving, by the displaying terminal, the high resolution layer image, and processing, by the displaying terminal, the to-be-processed layer image based on the high resolution layer image.

In some embodiments, before the step of delivering, by the displaying terminal, a to-be-processed layer image to the cloud server, the method further includes:

processing, by the displaying terminal, a layering and stretching processing on the to-be-processed layer image to acquire the to-be-processed layer image.

In some embodiments, after the step of processing, by the displaying terminal, the to-be-processed layer image based on the high resolution layer image, the method further includes:

compositing, by the displaying terminal, the to-be-processed layer after being processed to obtain a composite high resolution target image.

Besides, to realize the purpose above, the present disclosure also provide an image processing device. The image processing device includes: a memory, a processor, and an image processing program that is stored in the memory and executable on the processor. When the image processing program is executed by the processor, the steps below are realized:

receiving a to-be-processed layer image sent by a displaying terminal;

based on the to-be-processed layer image, querying a high resolution layer image that matches with the to-be-processed layer image in the preset database;

delivering the high resolution layer image to the displaying terminal, thereby the displaying terminal implements a processing on the to-be-processed layer image based on the high resolution layer image.

In some embodiments, when the image processing program is executed by the processor, the following steps are also carried out:

analyzing the to-be-processed layer image, acquiring a layer structure parameter of the to-be-processed layer image.

In some embodiments, when the image processing program is executed by the processor, the following step is also carried out:

based on the layer structure parameter of the to-be-processed layer image, querying the high resolution layer image that matches with the layer structure parameter of the to-be-processed layer image.

In some embodiments, when the image processing program is executed by the processor, the following step is being carried out:

delivering the high resolution layer image to the displaying terminal, thereby the displaying terminal carries out a pixel filling processing on the to-be-processed layer image based on the pixels of the high resolution layer image.

Besides, to realize the purpose above, the present disclosure also provides a computer readable storage medium storing an image processing program. When the image processing program is executed by the processor, the following steps are carried out:

receiving a to-be-processed layer image delivered by the displaying terminal;

based on the to-be-processed layer image, querying a high resolution layer image that matches with the to-be-processed layer image in a preset database;

delivering the high resolution layer image to the displaying terminal, thereby the displaying terminal processes the to-be-processed layer image based on the high resolution layer image.

In some embodiments, when the image processing program is executed by the processor, the following step is also being carried out:

analyzing the to-be-processed layer image, acquiring a layer structure parameter of the to-be-processed layer image.

In some embodiments, when the image processing program is executed by the processor, the following step is also being carried out:

based on the layer structure parameter of the to-be-processed layer image, querying the high resolution layer that matches with the layer structure parameters of the to-be-processed layer image in the preset database.

In some embodiments, when the image processing program is executed by the processor, the following step is also being carried out:

delivering the high resolution layer image to the displaying layer, thereby the displaying terminal implements a pixel filing processing on the to-be-processed layer image based on pixels of the high resolution layer image.

Besides, to realize the purpose above, the present disclosure also provides an image processing system, the image processing system includes a cloud server and a displaying terminal. The cloud server and the displaying terminal carry out the following steps:

delivering, by the displaying terminal, a to-be-processed layer image to the cloud server;

receiving, by the cloud server, the to-be-processed layer image, querying by the cloud server, a high resolution layer image that matches with the to-be-processed layer image based on the preset database, and delivering, by the cloud server, the high resolution layer image to the displaying terminal;

receiving, by the displaying terminal, t he high resolution layer image, and performing, by the cloud server, a processing on the to-be-processed layer image based on the high resolution layer image.

In some embodiments, before the step of delivering, by the displaying terminal, a to-be-processed layer image to the cloud server, there is also a step included:

performing, by the displaying terminal, a layering and stretching processing on an image of the to-be-processed layer, to acquire the to-be-processed layer image mentioned.

In some embodiments, after the step of receiving, by the displaying terminal, the high resolution layer image, and performing, by the displaying terminal, a processing on the to-be-processed layer image based on the high resolution layer image, there is also a step included:

compositing, by the displaying terminal, the to-be-processed layer image after being processed to obtain a composite high resolution target image.

The beneficial effects of the present disclosure are: the present disclosure provides an image processing method, a cloud server firstly receives a to-be-processed layer image delivered by a displaying terminal, and based on this to-be-processed layer image, searches out a high resolution layer image that matches with the to-be-processed layer image in a preset data base, then delivers the high resolution layer image to the displaying terminal, thereby the displaying terminal implements a processing on the to-be-processed layer image according to the high resolution layer image. The present disclosure puts forward an image processing method which combines the displaying terminal and the cloud server to process an image, which realizes an improvement on the efficiency of converting an image and an optimization of the resolution of the image, and provides a better watching experience for users.

A more detailed description of the realization of the purpose, the feature specialties and the adventures of the present disclosure will be provided according to the embodiments and the reference figures.

DETAILED DESCRIPTION OF THE EMBODIMENTS

It should be understood that the embodiments described here are merely used to explain the present disclosure, but not for limiting the present disclosure.

The major solutions of the embodiments of the present disclosure are: receiving a to-be-processed layer image delivered by a displaying terminal; based on the to-be-processed layer image, querying a high resolution layer image that matches with the to-be-processed layer image in a preset database; delivering the high resolution layer image to the displaying terminal, thereby the displaying terminal processes the to-be-processed layer image based on the high resolution layer image. Through the technical scheme in the embodiments of the present disclosure, a technical problem of the related technologies that an image converted by a displaying terminal is having low image resolution is solved.

Figure 1:
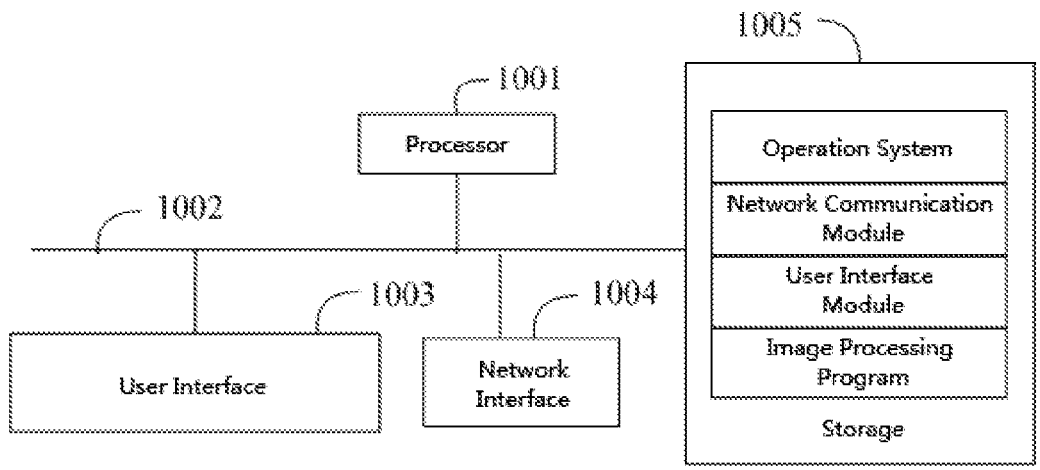
FIG. 1 is a schematic diagram of a structure of a device in the hardware operation environment involved in the embodiment scheme of the present disclosure.

According to FIG. 1, which is a schematic diagram of a structure of a device of the hardware operating environment involved in embodiments of the present disclosure, the device can include: a processor 1001, which for instance can be a CPU, a communication bus 1002, a user interface 1003, a network interface 1004, and a memory 1005. The communication bus 1002 is configured for the connection and communication among these components. The user interface 1003 can include a monitor (Display), an input unit for instance a keyboard (Keyboard). The user interface 1003 can optionally include a standard wired interface, and a standard wireless interface. The network interface 1004 can optionally include a standard wired interface, a wireless interface (for instance a WI-FI interface). The memory 1005 can be a high speed RAM memory, or be a stable memory (non-volatile memory), for instance a disk memory. The memory 1005 may optionally be independent from the memory device of the processor 1001.

In one embodiment, the device can also include a camera, a RF (Radio Frequency) circuit, a sensor, an audio frequency circuit, a WiFi module, etc. Of course, the device can also be equipped with a gyroscope, a barometer, a hygrometer, an infrared sensor and other types of sensors which are not described herein.

Those skilled in the art can understand that, the structure of the device shown in FIG. 1 is not forming any limit on the device, the device can include more or less components than what has been shown in the figure, or combining some components, or with different arrangement of the components.

According to the FIG. 1, a memory 1005 as a computer memory medium can include an operation system, a network communication module, a user interface module and an image processing program.

In the device of FIG. 1, the processor 1001 and the memory 1005 can be included in a device which calls the image processing program stored in the memory 1005 through the processor 1001, and executes the operations below:

receiving a to-be-processed layer image delivered by a displaying terminal;

based on the to-be-processed layer image, querying a high resolution layer image that matches with the to-be-processed layer image in a preset database;

delivering the high resolution layer image to the displaying terminal, thereby the displaying terminal processes the to-be-processed layer image based on the high resolution layer image.

The processor 1001 can call the image processing program stored in the memory 1005, and execute the following operation:

analyzing the to-be-processed layer image, acquiring layer structure parameters of the to-be-processed layer image.

The processor 1001 can call the image processing program stored in the memory 1005, and execute the following operation:

based on the layer structure parameters of the to-be-processed layer image, querying the high resolution layer image that matches with the layer structure parameters of the to-be-processed layer image in the preset database.

The processor 1001 can call the image processing program stored in the memory 1005, and execute the following operation:

delivering the high resolution layer image to the displaying terminal, thereby the displaying terminal implements a pixel filling process on the to-be-processed layer image based on pixels of the high resolution layer image.

In the scheme provided in this embodiment, a cloud server firstly receives the to-be-processed layer image delivered by the displaying terminal, queries the high resolution layer image that matches with the to-be-processed layer image in the preset database. The high resolution layer image acquired is delivered to the displaying terminal, thereby the displaying terminal processes the to-be-processed layer image according to the high resolution layer image. The image processing method provided in the present disclosure combines the displaying terminal and the cloud server for implementing the image processing, thereby optimizing the efficiency of the image transformation, improving the resolution of the image, and providing a better watching experience to users.

Based on the hardware structure above, an embodiment of an image processing method of the present disclosure is provided.

Figure 2:
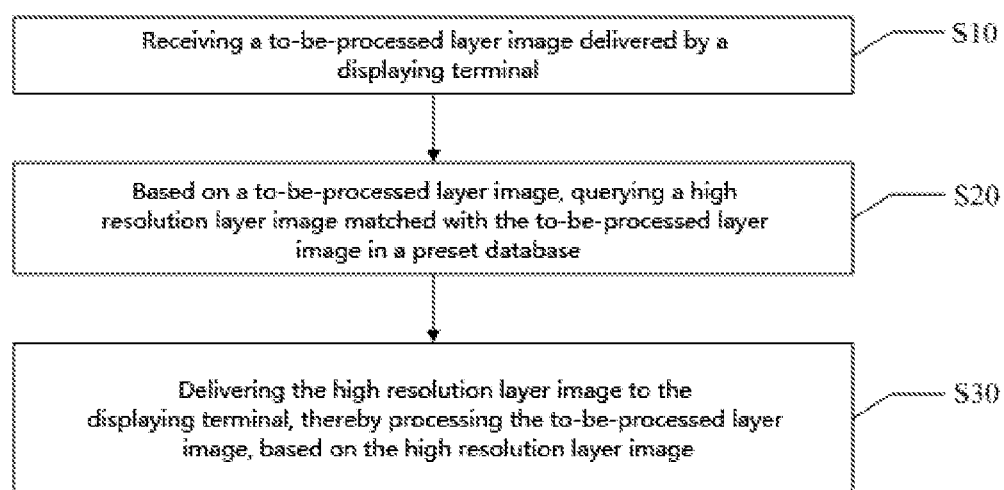
FIG. 2 is a schematic flowchart of a first embodiment of an image processing method of the present disclosure.

Referring to FIG. 2, FIG. 2 is a schematic flowchart of a first embodiment of the image processing method, in this embodiment, the method includes:

step S10, receiving a to-be-processed layer image delivered by a displaying terminal;

step S20, based on the to-be-processed layer image, querying a high resolution layer image that matches with the to-be-processed layer image in a preset database;

step S30, delivering the high resolution layer image to the displaying terminal, thereby the displaying terminal implements a process on the to-be-processed layer image based on the high resolution layer image.

Nowadays, 4K televisions have been pervading the market rapidly. However, there are very little contents for 4K television, the video source is in severe shortage. Therefore, for the moment it usually implements a local interpolation processing treatment on the 2K low resolution images using a 4K television terminal device directly, transforming the low resolution images into high resolution images which are to be used for broadcasting. However, this method requires the 4K television terminal device to have extremely high configuration, and the cost is relatively high. Furthermore, the images transformed are usually jagged, distorted, and fuzzy, the actual definition of which are not good, failed to provide a good user experience.

Therefore, to solve the technical problem, the present disclosure puts forward an image processing method, where a displaying terminal implements a corresponding process on an image of low resolution and definition to acquire a to-be-processed layer image, and delivers the to-be-processed layer image to a cloud server. After the cloud server receives the to-be-processed layer image, the cloud server searches in the cloud database, acquires a corresponding, similar high resolution and high definition layer image, and delivers the high resolution and high definition layer image back to the displaying terminal, thereby the displaying terminal processes its own to-be-processed layer image of low resolution and definition according to the received high resolution and high definition layer image, and acquires a corresponding target layered image of high resolution, thereby acquiring a target image of high resolution and realizing an improvement of the image resolution.

It is understandable that, in this embodiment, the displaying terminal can be: a television, a computer, a phone or another like device with displaying feature. In this embodiment, to make it more convenient to be described, a television is used to be an example for the corresponding explanation.

In this embodiment, a television terminal delivers a to-be-processed image of low resolution to a cloud server. Specifically, the delivered image that has been subjected to a layering and stretching process to acquire to-be process layer images. Each of the to-be-processed layer images is delivered to a cloud server one by one in order. The television then receives multiple images of high resolution and definition delivered back from the cloud server, and implements corresponding process to each of to-be-processed layer images to acquire multiple corresponding target layered images of high resolution, the television composite the target layered images of high resolution to acquire a final target image of high resolution, thereby realizing the optimization of the image resolution.

In one embodiment, the television terminal performs a layering process on the to-be-processed image whose resolution is yet to be improved, to acquire corresponding layered images, then implementing a stretching process on the layered images with a corresponding magnification. Then the layered image after being performed with a stretching process is acquired, which is referring to the to-be-processed layer images mentioned above. The to-be-processed layer images are delivered to the cloud server.

Furthermore, after the cloud server receives the to-be-processed layer images, it firstly acquires layer structure parameters of the to-be-processed layer images, then searches in the cloud database according to the layer structure parameters, in order to find out high resolution layer images matched with and similar to the to-be-processed layer images. The high resolution layer images are delivered to the television terminal, activating the television terminal to implement an process on the to-be-processed layer images according to the high resolution layer images, thereby realizing the optimization of the resolution.

Furthermore, except for searching according to the layer structure parameters of the to-be-processed layer images, and acquiring matched and similar layer images of high resolution, the cloud server can also extract the to-be-processed layer image to acquire extracted physical objects whose object structure parameters are obtained. Then the cloud server searches in the cloud database according to each of the object structure parameters, and acquires matched and similar objects of high resolution. The cloud server further combines each object of high resolution, thereby acquiring a layer image of a high resolution, which is to be delivered to the television terminal.

Furthermore, after the television terminal receives the high resolution layer image delivered back from the cloud server, correlating the high resolution layer image with the corresponding to-be-processed layer image, in order to use the pixels of the high resolution layer image accordingly to implement a pixel filling process on correspond pixels of the to-be-processed layer image. Then a high resolution target layered image corresponding to the to-be-processed layer image is acquired. It is understandable that, after the pixel filling process, a correspond smoothing process upon the filled image is required, so as to acquire a target layered image of high resolution.

Furthermore, after acquiring the target layered images of high resolution, all the target layered images of high resolution are composited, and a primary target image is acquired. Then a series of processes like blank-area-filling process, mutation-area-smoothing process, etc. are performed on the primary target image, which results in acquiring a final target high resolution image. Comparing to the initial to-be-processed image with a to-be-optimized resolution, the final target image has a higher resolution and better definition, efficiently having the image resolution optimized.

In this embodiment, the cloud server firstly receives the to-be-processed layer images delivered by the displaying terminal, and based on the to-be-processed layer images, queries high resolution and high definition layer images matched with the to-be-processed layer images in the preset database, and then delivers the high resolution and high definition layer images to a displaying terminal to help the displaying terminal to process the to-be-processed layer images according to the high resolution and high definition layer images. The image processing method provided by the present disclosure combines the displaying terminal and the cloud server to perform an image processing, making the efficiency of the image transformation processing higher, realizing an optimization on the image resolution, and providing better watching experience to users.

Figure 3:
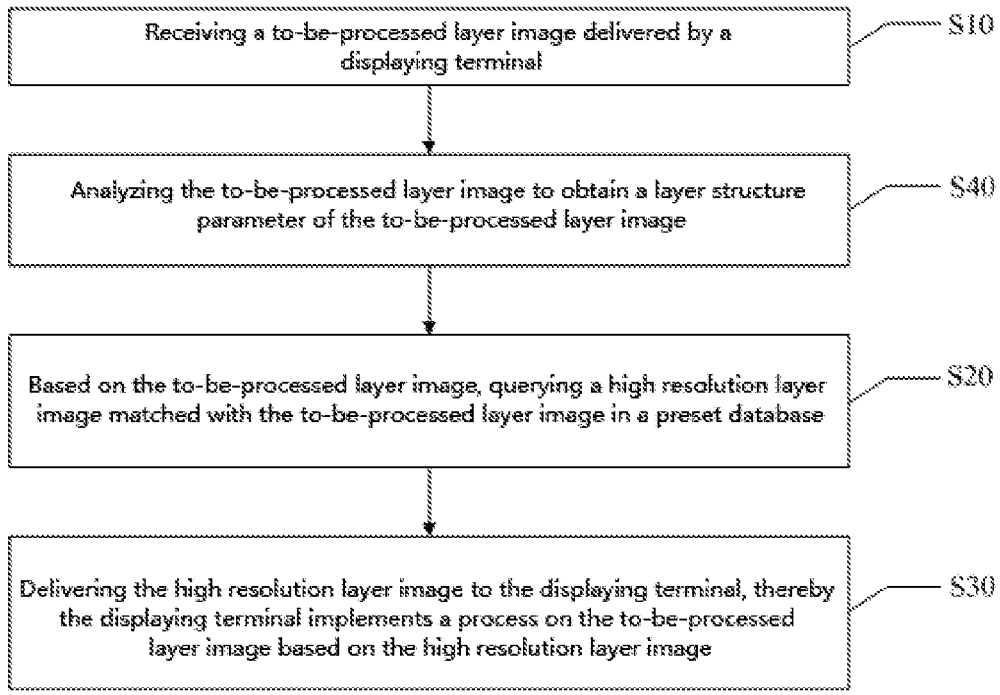
FIG. 3 is a schematic flowchart of a second embodiment of the image processing method of the present disclosure.

Referring to FIG. 3, based on the above embodiment, a second embodiment of the image processing method of the present disclosure is provided, and in the present embodiment, the step S10 includes:

step S40, analyzing the to-be-processed layer image to obtain a layer structure parameter of the to-be-processed layer image.

In the embodiment, after the cloud server receives the to-be-processed layer image delivered by the displaying terminal, a layer structure parameter of a to-be-processed layer image is obtained, and then according to the layer structure parameter of the to-be-processed layer image, querying in a cloud database to obtain a similar high definition and high resolution layer image.

Furthermore, the step S20 includes:

step a, based on layer structure parameters of the to-be-processed layer image, querying a high resolution layer image matched with the layer structure parameters of the to-be-processed layer image in the preset database.

Specifically, after receiving the to-be-processed layer image, the cloud server analyzes the to-be-processed layer image, obtains the layer structure parameters thereof, the layer structure parameters may include a contour of the layer, a brightness pixel distribution, a color composition and distribution, and other information. Matching search is performed in the preset database according to the layer structure parameters, and the high definition and high resolution layer image with the similar layer structure parameters is obtained.

Furthermore, if a matched high definition and high resolution layer image is not found in the cloud database according to the layer structure parameters of the to-be-processed layer image, corresponding physical objects can also be obtained by extracting the to-be-processed layer image, the object structure parameters of each of the physical objects are obtained, and then a searching is carried out in the cloud database according to the object structure parameters of the physical objects, so that similar high definition and high resolution objects are obtained, the high resolution and high resolution object are composited and a high definition and high resolution layer image can be obtained.

Specifically, the cloud server identifies and calibrates each object by searching and detecting a boundary and a contour of each object in the to-be-processed layer image, identifying each object and extracting each object to obtain multiple extracted objects. At the same time, the cloud sever also generates a spatial position identifier corresponding to each object. Then, the object structure parameters of the object can be acquired. The object structure parameters of each object include a contour of the object, a brightness pixel distribution, a color composition and distribution. A search is performed in the cloud database according to the object structure parameters to obtain a corresponding high definition and high resolution object with similar object structures. According to the corresponding spatial position identifiers, the high definition and high resolution objects corresponding to the objects are composited, and thus the high resolution layer image with high definition can be obtained.

In the embodiment, after receiving the to-be-processed layer image delivered by the displaying terminal, the cloud server analyzes the to-be-processed layer image to obtain layer structure parameters, and queries a matched high resolution layer image in a preset database according to the layer structure parameters, so as to deliver the high resolution layer image to the displaying terminal for processing the to-be-processed layer image, so as to improve the image resolution.

Figure 4:
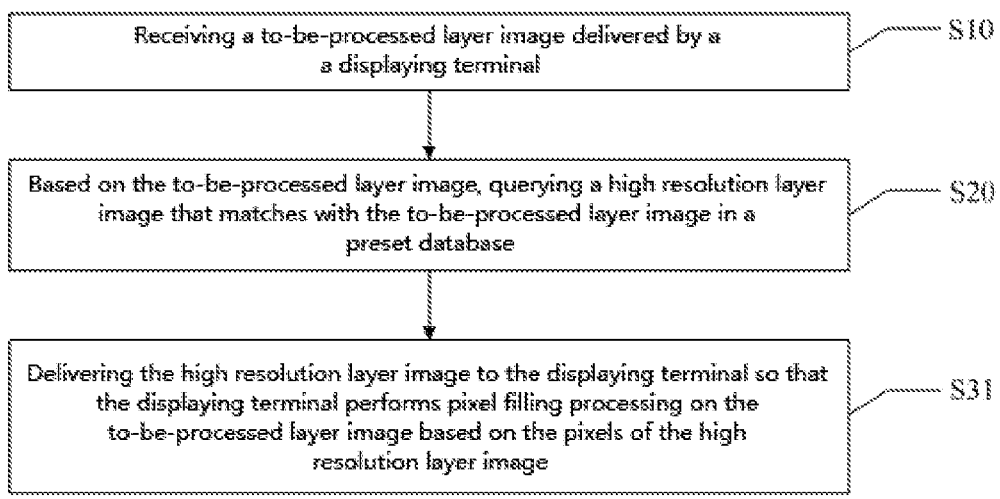
FIG. 4 is a schematic flowchart of a third embodiment of the image processing method of the present disclosure.

Referring to FIG. 4, according to the above embodiment, a third embodiment of the image processing method of the present invention is provided, and in the present embodiment, the step S30 includes:

step S31, delivering the high resolution layer image to the displaying terminal so that the displaying terminal performs pixel filling processing on the to-be-processed layer image based on the pixels of the high resolution layer image.

In this embodiment, after receiving the high resolution layer image delivered by the cloud server, the displaying terminal associates the high resolution layer image with the corresponding to-be-processed layer image, and fills the pixels of the to-be-processed layer image according to the pixels of the high resolution layer image to obtain the corresponding high resolution target layered image.

Furthermore, whether the obtained high resolution target layered image needs to be subjected to a smoothing processing or not needs to be determined. The purpose of implementing the smoothing processing is mainly to make a size order of the definition of the target layered image the same as a size order of the definition of the to-be-processed layer image that is not processed yet, so that definition distortion and jagged image are avoided when the target layered image is composited subsequently.

Specifically, whether the smoothing processing needs to be performed or not is determined according to the size of the definition value of the to-be-processed layer image. After the displaying terminal performs a layer stretching processing on the to-be-processed image, each individual to-be-processed layer image is obtained, a grayscale map of the to-be-processed layer image is obtained, and a highest frequency component value of the grayscale map of the to-be-processed layer image is obtained by further adopting a frequency domain conversion function (such as a Fourier transform function), defining the highest frequency component value as a definition value of the to-be-processed layer image DF (Definition value), and the definition value $DF_i$ (i=1, 2 to n) of each to-be-processed layer image can be obtained sequentially. The 'i' here represents the number of layers where the to-be-processed layer image is located, and a serial number corresponding to each to-be-processed layer image can be generated according to each definition value $DF_i$. For example, if a definition value of a second layer to-be-processed layer image is the maximum, the sequence number corresponding to the second layer to-be-processed layer image is $DF2\_1$; and if the definition value of the second layer to-be-processed layer image is the second maximum, the corresponding sequence number is $DF2\_2$.

Furthermore, the obtained high resolution target layered image is also subjected to a graying processing to obtain a grayscale map of the layered image, and the highest frequency component value of each grayscale map is obtained by further adopting a frequency domain conversion function (for instance a Fourier transformation function), so that the definition value corresponding to each target layered image can be estimated, and the definition value is denoted as $OB\_DF_i$ (objective, target). At this time, it is necessary to determine whether the target layered image corresponding to the to-be-processed layer image needs to be performed a smoothing processing according to the definition value of the to-be-processed layer image. For instance, if the sequence number corresponding to the second layer to-be-processed layer image is $DF2\_1$, and the sequence number corresponding to the seventh layer to-be-processed layer image is $DF7\_2$, then the corresponding definition value $OB\_DF2$ should be the largest, and the second largest is the $OB\_DF7$, if $OB\_DF7$ is greater than $OB\_DF2$, then the target layered image corresponding to the seventh-layer to-be-processed layer image needs to be smoothed, so that the definition thereof is reduced, and the definition does not exceed $OB\_DF2$.

Specifically, a smoothing process for reducing the definition of a target layered image can be achieved by setting a low-pass filter. For example, assuming that the definition of the target layered image is $OB\_DF_i$, the definition of the target layered image is required to be reduced to $OB\_DF_i\_DOWN$, then the cutoff frequency of the low-pass filter is set to $K*OB\_DF_i\_DOWN$ (K is a set parameter). The target layered image is filtered by the filter, and the frequency component between $OB\_DF_i\_DOWN$ and $OB\_DF_i$ is eliminated or reduced. In the embodiment, the filtered image is still named as a target layered image, and the definition value is still named as $OB\_DF_i$, but the actual definition value is the value of the $OB\_DF_i\_DOWN$.

In this embodiment, after receiving the high resolution layer image returned by the cloud server, the displaying terminal performs a pixel filling processing on the to-be-processed layer image according to the pixels of the high resolution layer image to obtain a high resolution target layered image, and performs a smoothing processing on the high resolution target layered image so as to avoid an occurrence of sharpness distortion and jagged image, etc., thereby improving the resolution of the image.

The embodiment of the disclosure also provides an image processing method.

Figure 5:
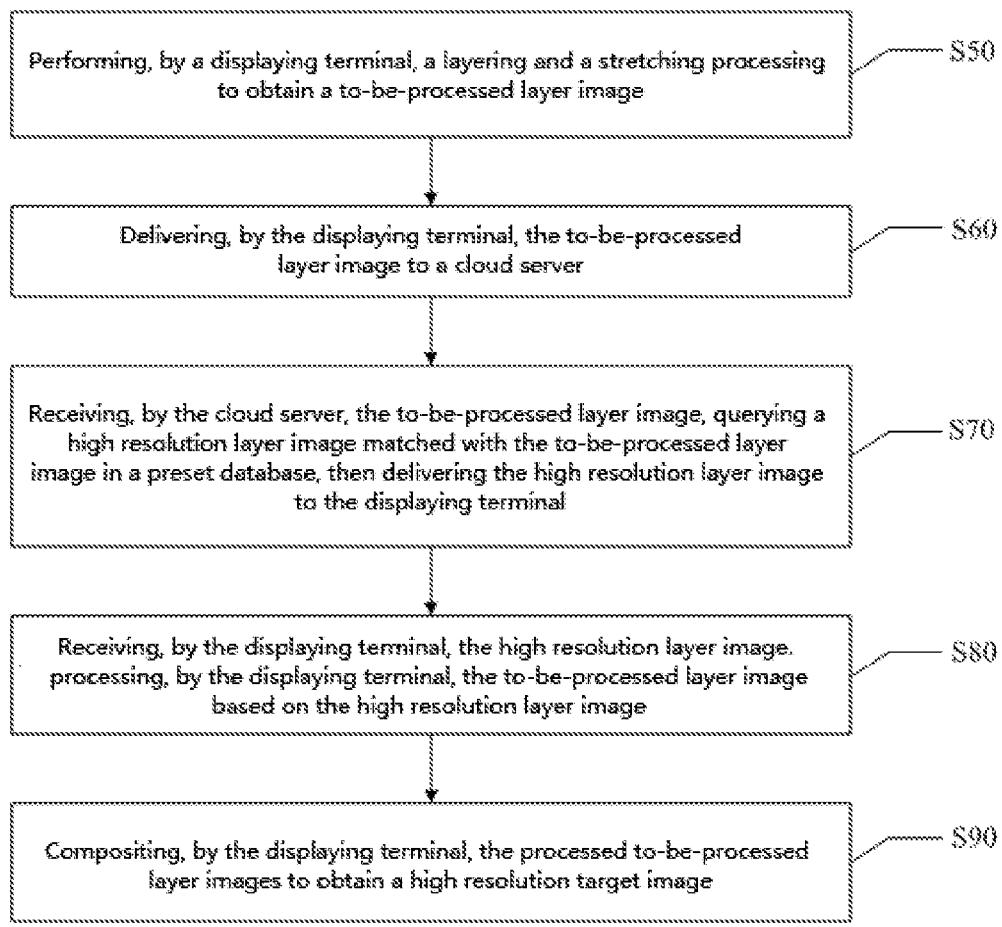
FIG. 5 is a schematic flowchart of a fourth embodiment of the image processing method of the present disclosure.

Referring to FIG. 5, FIG. 5 is a process diagram of a fourth embodiment of an image processing method of the present disclosure, the method includes:

step S50, layering and stretching a to-be-processed image, by the displaying terminal, to obtain to-be-processed layer images;

step S60, delivering, by the displaying terminal, the to-be-processed layer images to a cloud server;

step S70, receiving, by the cloud server, the to-be-processed layer images, querying, by the cloud server, high resolution layer images matched with the to-be-processed layer images in a preset database, and returning, by the cloud server, the high resolution layer images to the displaying terminal;

step S80, receiving, by the displaying terminal, the high resolution layer images, and processing, by the displaying terminal, the to-be-processed layer images based on the high resolution layer images;

step S90, compositing, by the displaying terminal, the processed to-be-processed layer images to obtain a composite high resolution target image.

In this embodiment, a to-be-processed layer image that the displaying terminal delivers to the cloud server is obtained after a layering and a stretching processing of a to-be-processed image with a to-be-improved resolution performed by the displaying terminal.

Specifically, the displaying terminal analyzes the to-be-processed image, sequentially divides the to-be-processed image into different image layers according to information such as distances, overlaps, the relative directions and postures of the objects in the image, and performs a graying processing on the layered images in the image layers to obtain the grayscale map, and further adopting a frequency domain conversion function (such as a Fourier transformation function) to obtain the highest frequency component value of each grayscale map, which is defined as the definition value of each layered image, so as to obtain the definition value of each layered image in sequence.

Furthermore, each layered image is stretched according to a magnification to obtain a stretched layered image, namely a to-be-processed layer image, and a serial number corresponding to the to-be-processed layer image is generated according to the definition value of each layered image.

In some embodiments, according to pixels of an image whose resolution is required to be improved and pixels of an expected image with target resolution, the magnification of stretching enlarging the layered image is calculated. For example, if pixels of a to-be-processed image is 1920*1080, and pixels of an expected target resolution image is 3840*2160, a calculated magnification is 2*2. Each layered image is stretched according to the calculated magnification to obtain a stretched layered image, namely a to-be-processed layer image. A sequence number corresponding to the to-be-processed layer image is generated according to the definition value corresponding to each layered image. For example, if a definition value of a second-layer to-be-processed layer image is the maximum, a sequence number corresponding to the second-layer to-be-processed layer image is DF2_1; and if the definition value of the second-layer to-be-processed layer image is the second largest, the corresponding sequence number is DF2_2.

In this embodiment, when the displaying terminal receives the high resolution layer image returned by the cloud server, after a pixel filling processing is performed on the to-be-processed layer image according to the pixels of the high resolution layer image, the displaying terminal also needs to composite the processed to-be-processed layer images to obtain the final high resolution target image.

In some embodiments, the displaying terminal performs the filling and smoothing process on pixels in corresponding positions of the to-be-processed layer image to obtain a corresponding high resolution target layered image, then composites the high resolution target layered image to obtain a primary target image, and performs blank area filling and mutation region smoothing processing on the primary target image to obtain a final target image, thereby improving the image resolution. In one embodiment, the displaying terminal sequentially places a high resolution target layered image in a corresponding position according to the order and position of the image layer of a corresponding original to-be-processed layer image, and composites all the high resolution target layered images to obtain the primary target image.

Furthermore, whether a blank area exists in the primary target image or not is determined, if the primary target image has an all-black-pixels area, it is needed to check a corresponding area of a resolution-to-be-improved image. If the corresponding area of the resolution-to-be-improved image is also an all-black-pixels area, it is determined that no blank area exists in the primary target image, and otherwise, it is determined that a blank area exists. If there is a blank area in the primary target image, the blank area of the primary target image is filled according to pixels of a corresponding area of the resolution-to-be-improved image to obtain a blank area filled image.

Furthermore, an image with the blank area filled is subjected to a graying processing to obtain a grayscale map of the image, and then a frequency domain conversion function (such as a Fourier transformation function) is adopted to obtain the frequency component of the image. If there is an abnormal frequency component (e.g., a very narrow band of high frequency), the image is considered to be mutated, and at this time, the image is smoothed according to a preset smoothing processing filtering function, so as to eliminate or reduce the abnormal frequency component of the image, thereby obtaining a final high resolution target image, and improving the image resolution.

In this embodiment, the displaying terminal firstly performs the layering and the stretching processing on the resolution-to-be-improved image. The to-be-processed layer image is obtained. According to the received to-be-processed layer image, the cloud server queries a high resolution layer image matched with the to-be-processed layer image in the preset database and returns the high resolution layer image to the displaying terminal; after receiving the high resolution layer image, the displaying terminal processes the to-be-processed layer image based on the high resolution layer image, and all the processed to-be-processed layer images are composited to obtain the final high resolution target image, so that the image resolution is improved, and the watching user experience is also improved.

The embodiment of the disclosure also provides a computer readable memory medium. An image processing program is stored on the computer readable memory medium, and the image processing program is executable by a processor to carry out the following steps:

receiving a to-be-processed layer image delivered by a displaying terminal;

based on the to-be-processed layer image, querying a high resolution layer image matched with the to-be-processed layer image in a preset database;

delivering the high resolution layer image to the displaying terminal, thereby the displaying terminal processes the to-be-processed layer image based on the high resolution layer image.

The image processing program, when executed by the processor, also carries out the following step:

analyzing the to-be-processed layer image to obtain a layer structure parameter of the to-be-processed layer image.

The image processing program, when executed by the processor, also carries out the following step:

based on a layer structure parameter of the to-be-processed layer image, querying the high resolution layer image matched with the layer structure parameter of the to-be-processed layer image in the preset database.

The image processing program, when executed by the processor, also carries out the following step:

delivering the high resolution layer image to the displaying terminal, thereby the displaying terminal performs pixel filling processing on the to-be-processed layer image based on pixels of the high resolution layer image.

According to the scheme provided by the embodiment, a cloud server firstly receives the to-be-processed layer image delivered by the displaying terminal, searches the preset database for a high definition and high resolution layer image matched with the to-be-processed layer image on the basis of the to-be-processed layer image, and delivers the acquired high definition and high resolution layer image to the displaying terminal, so that the displaying terminal processes the to-be-processed layer image according to the high definition and high resolution layer image. According to the image processing method provided by the disclosure, the displaying terminal and the cloud server are combined to perform image processing, so that the image conversion processing efficiency is higher, the image resolution is improved, and a better watching experience is provided for the users.

Figure 6:
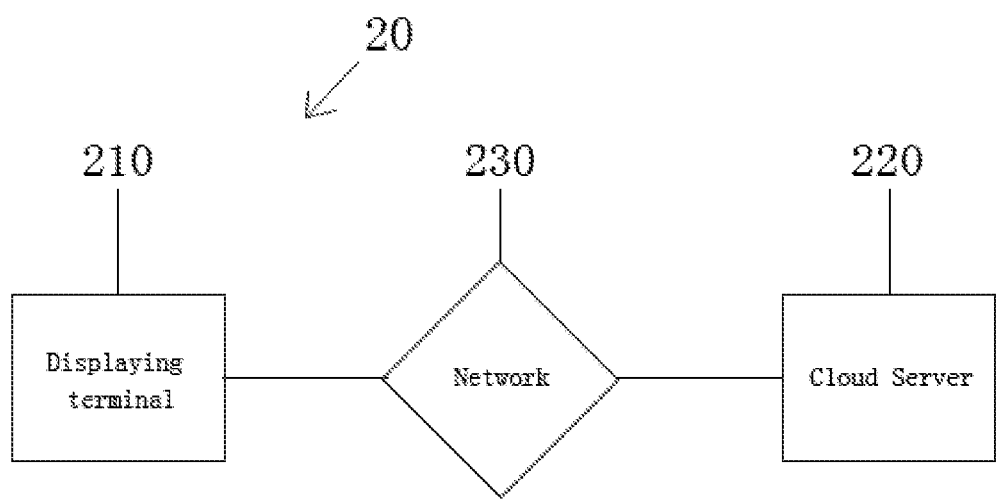
FIG. 6 is a schematic view of an image processing system of the present disclosure.

Referring to FIG. 6, FIG. 6 shows an image processing system 20. The image processing system includes a displaying terminal 210 and a cloud server 220. The displaying terminal 210 and the cloud server 220 communicate via a network 230. The displaying terminal 210 and the cloud server 220 each can be equipped with hardware and software liking the device of FIG. 1. The displaying terminal 210 and the cloud server 220 each can be an image processing device and can cooperatively perform the image processing method as described above.

It should be noted that, herein, the terms "include", "comprise" or any other variation thereof, are intended to cover a non-exclusive inclusion, such that a process, method, article, or system that includes a series of elements not only includes those elements but also includes other elements not expressly listed, or that is an element inherent to such process, method, article, or system. In the absence of more constraints, elements limited by a term "includes one . . . " do not preclude the presence of additional identical elements in the process, method, article, or system that includes the same element.

The serial numbers of the embodiments of the present disclosure are described merely for the purpose of description and do not represent the advantages and disadvantages of the embodiments.

Through the description of the embodiments above, it will be clear to those skilled in the technical field that the above-described embodiments can be realized by a method of using a software plus a necessary general hardware platform, although, of course, the former can be also implemented in hardware, but in many cases the former is a better embodiment. Based on such an understanding, the technical solutions of the present disclosure may be embodied in the form of a software product that is stored in a memory medium (e.g., a ROM/RAM, a magnetic disk, an optical disk), including several instructions for causing a terminal device (which may be a cell phone, a computer, a server, an air conditioner, or a network device, etc.) to perform the method of various embodiments of the present disclosure.

The above is merely a preferred embodiment of the present disclosure and is not intended to limit the scope of the present disclosure. Any equivalent structure or equivalent process transformation made by using the description and the drawings of the present disclosure is applied to other related technical fields either directly or indirectly, and are all included in the patent protection scope of the present disclosure.

What is claimed is:

1. An image processing method, the method comprising the following steps:
    receiving a to-be-processed layer image delivered by a displaying terminal;
    querying a high resolution layer image matched with the to-be-processed layer image in a preset database based on the to-be-processed layer image; and
    delivering the high resolution layer image to the displaying terminal, thereby the displaying terminal processes the to-be-processed layer image based on the high resolution layer image;
    wherein after the step of receiving a to-be-processed layer image delivered by a displaying terminal, the method further comprises:
        searching and detecting a boundary and a contour of each object in the to-be-processed layer image to identify and calibrate each object;
        extracting each object to obtain multiple extracted objects and generating a spatial position identifier corresponding to each object; and
        acquiring an object structure parameter of each object;
    wherein the step of querying a high resolution layer image matched with the to-be-processed layer image in a preset database based on the to-be-processed layer image comprises:
        querying a high definition and high resolution object in the preset database based on the object structure parameter of each object; and
        compositing the high definition and high resolution object corresponding to each object according to the spatial position identifier to obtain the high resolution layer image.

2. The image processing method according to claim 1, wherein after the step of receiving a to-be-processed layer image delivered by a displaying terminal, the method further comprises:
    analyzing the to-be-processed layer image to obtain a layer structure parameter of the to-be-processed layer image.

3. The image processing method according to claim 2, wherein the step of querying a high resolution layer image matched with the to-be-processed layer image in a preset database based on the to-be-processed layer image comprises:
    querying a high resolution layer image matched with a layer structure parameter of the to-be-processed layer image in the preset database based on the layer structure parameter of the to-be-processed layer image.

4. The image processing method according to claim 1, wherein the step of delivering the high resolution layer image to the displaying terminal, thereby the displaying terminal processes the to-be-processed layer image based on the high resolution layer image comprises:
    delivering the high resolution layer image to the displaying terminal, thereby the displaying terminal performs a pixel filling processing on the to-be-processed layer image based on pixels of the high resolution layer image.

5. An image processing device, wherein the image processing device comprises a memory, a processor, and an image processing program stored in the memory and executable by the processor, the image processing program is executable by the processor to carry out the following steps:
    receiving a to-be-processed layer image delivered by a displaying terminal;

querying a high resolution layer image matched with the to-be-processed layer image in a preset database based on the to-be-processed layer image; and delivering the high resolution layer image to the displaying terminal, thereby the displaying terminal processes the to-be-processed layer image based on the high resolution layer image;

wherein after the step of receiving a to-be-processed layer image delivered by a displaying terminal, the following steps are carried out:

searching and detecting a boundary and a contour of each object in the to-be-processed layer image to identify and calibrate each object;

extracting each object to obtain multiple extracted objects and generating a spatial position identifier corresponding to each object; and acquiring an object structure parameter of each object;

wherein the step of querying a high resolution layer image matched with the to-be-processed layer image in a preset database based on the to-be-processed layer image comprises:

querying a high definition and high resolution object in the preset database based on the object structure parameter of each object; and compositing the high definition and high resolution object corresponding to each object according to the spatial position identifier to obtain the high resolution layer image.

6. The image processing device according to claim 5, wherein the image processing program is executable by the processor to further carry out the following step:

analyzing the to-be-processed layer image to obtain a layer structure parameter of the to-be-processed layer image.

7. The image processing device according to claim 5, wherein the image processing program is executable by the processor to further carry out the following step:

based on a layer structure parameter of the to-be-processed layer image, querying the high resolution layer image matched with the layer structure parameter of the to-be-processed layer image in the preset database.

8. The image processing device according to claim 5, wherein the image processing program is executable by the processor to further carry out the following step:

delivering the high resolution layer image to the displaying terminal, thereby the displaying terminal performs a pixel filling processing on the to-be-processed layer image based on pixels of the high resolution layer image.

9. A computer readable storage medium, wherein an image processing program is stored on the computer readable storage medium, and the image processing program is executable by a processor to carry out the following steps:

receiving a to-be-processed layer image delivered by a displaying terminal;

based on the to-be-processed layer image, querying a high resolution layer image matched with the to-be-processed layer image in a preset database; and delivering the high resolution layer image to the displaying terminal, thereby the displaying terminal processes the to-be-processed layer image based on the high resolution layer image;

wherein after the step of receiving a to-be-processed layer image delivered by a displaying terminal, the following steps are carried out:

searching and detecting a boundary and a contour of each object in the to-be-processed layer image to identify and calibrate each object;

extracting each object to obtain multiple extracted objects and generating a spatial position identifier corresponding to each object; and acquiring an object structure parameter of each object;

wherein the step of querying a high resolution layer image matched with the to-be-processed layer image in a preset database based on the to-be-processed layer image comprises:

querying a high definition and high resolution object in the preset database based on the object structure parameter of each object; and compositing the high definition and high resolution object corresponding to each object according to the spatial position identifier to obtain the high resolution layer image.

10. The computer readable storage medium according to claim 9, wherein the image processing program is executable by the processor to further carry out the following step:

analyzing the to-be-processed layer image to obtain a layer structure parameter of the to-be-processed layer image.

11. The computer readable storage medium according to claim 9, wherein the image processing program is executable by the processor to further carry out the following step:

based on the layer structure parameters of the to-be-processed layer image, querying a high resolution layer image matched with a layer structure parameter of the to-be-processed layer image in the preset database.

12. The computer readable storage medium according to claim 9, wherein the image processing program is executable by the processor to further carry out the following step:

delivering the high resolution layer image to the displaying terminal, thereby the displaying terminal performs a pixel filling processing on the to-be-processed layer image based on pixels of the high resolution layer image.

13. An image processing system, wherein the image processing system comprises a cloud server and a displaying terminal, and the cloud server and the displaying terminal are executable to carry out the following steps:

delivering, by the displaying terminal, a to-be-processed layer image to the cloud server;

receiving, by the cloud server, the to-be-processed layer image, querying, by the cloud server, a high resolution layer image matched with the to-be-processed layer image in a preset database, and sending, by the cloud server, the high resolution layer image to the displaying terminal; and receiving, by the displaying terminal, the high resolution layer image and processing, by the displaying terminal, the to-be-processed layer image based on the high resolution layer image;

wherein after the step of delivering, by the displaying terminal, a to-be-processed layer image to the cloud server, the following steps are carried out:

searching and detecting, by the cloud server, a boundary and a contour of each object in the to-be-processed layer image to identify and calibrate each object;

extracting, by the cloud server, each object to obtain multiple extracted objects and generating a spatial position identifier corresponding to each object; and acquiring, by the cloud server, an object structure parameter of each object;

wherein the step of querying, by the cloud server, a high resolution layer image matched with the to-be-processed layer image in a preset database comprises:
    querying, by the cloud server, a high definition and high resolution object in the preset database based on the object structure parameter of each object; and
compositing, by the cloud server, the high definition and high resolution object corresponding to each object according to the spatial position identifier to obtain the high resolution layer image.

14. The image processing system according to claim 13, wherein before the step of delivering, by the displaying terminal, a to-be-processed layer image to the cloud server, the cloud server and the displaying terminal are executable to further carry out the following step:
    performing, by the displaying terminal, a layering and a stretching processing on the to-be-processed image to obtain a to-be-processed layer image.

15. The image processing system according to claim 13, wherein after receiving, by the displaying terminal, the high resolution layer image, and processing, by the displaying terminal, the to-be-processed layer image based on the high resolution layer image, the cloud server and the displaying terminal are executable to further carry out the following step:
    compositing, by the displaying terminal, the processed to-be-processed layer image to obtain a composited high resolution target image.

* * * * *